US 12,045,853 B2

United States Patent
Handrigan et al.

(10) Patent No.: US 12,045,853 B2
(45) Date of Patent: Jul. 23, 2024

(54) METHODS AND SYSTEMS FOR ONLINE TO OFFLINE CONVERSION TRACKING AN OPTIMIZATION

(71) Applicant: ADVOCADO, INC., St. Louis, MO (US)

(72) Inventors: Brian Handrigan, Wildwood, MO (US); Jeffrey Linihan, St. Louis, MO (US)

(73) Assignee: ADVOCADO, INC., St. Louis, MO (US)

( * ) Notice: Subject to any disclaimer, the term of this patent is extended or adjusted under 35 U.S.C. 154(b) by 0 days.

(21) Appl. No.: 16/641,135

(22) PCT Filed: Aug. 21, 2018

(86) PCT No.: PCT/US2018/047374
§ 371 (c)(1),
(2) Date: Feb. 21, 2020

(87) PCT Pub. No.: WO2019/040523
PCT Pub. Date: Feb. 28, 2019

(65) Prior Publication Data
US 2020/0175545 A1  Jun. 4, 2020

Related U.S. Application Data

(60) Provisional application No. 62/548,166, filed on Aug. 21, 2017.

(51) Int. Cl.
*G06Q 30/0242* (2023.01)
*G06F 16/958* (2019.01)
(Continued)

(52) U.S. Cl.
CPC ....... *G06Q 30/0246* (2013.01); *G06F 16/958* (2019.01); *G06Q 30/0276* (2013.01);
(Continued)

(58) Field of Classification Search
CPC .......... G06Q 30/0246; G06Q 30/0276; G06Q 30/0277; G06Q 30/0251; G06F 16/958; H04L 65/1069; H04L 67/22; H04L 67/535
See application file for complete search history.

(56) References Cited

U.S. PATENT DOCUMENTS

2011/0145076 A1   6/2011  Ramer
2013/0185153 A1   7/2013  Howcroft
(Continued)

OTHER PUBLICATIONS

International Search Report for related International Application No. PCT/US2018/047374; report dated Nov. 7, 2018; (2 pages).
(Continued)

*Primary Examiner* — Alexandru Cirnu
(74) *Attorney, Agent, or Firm* — NORTON ROSE FULBRIGHT US LLP

(57) ABSTRACT

A call conversion tracking system that automatically tracks call-based communications initiated from web-based invitational content id disclosed. The system generates and presents a web-based invitation that includes a dynamically assigned telephone number that is assigned to an anonymous web visitor with advertising metadata that is usually sent to a web server when a user clicks (or taps) an online ad.

20 Claims, 6 Drawing Sheets

(51) Int. Cl.
  *G06Q 30/0241* (2023.01)
  *H04L 65/1069* (2022.01)
  *H04L 67/50* (2022.01)
(52) U.S. Cl.
  CPC ..... *G06Q 30/0277* (2013.01); *H04L 65/1069* (2013.01); *H04L 67/535* (2022.05)

(56) References Cited

U.S. PATENT DOCUMENTS

| | | |
|---|---|---|
| 2014/0046755 A1 | 2/2014 | Lieberman et al. |
| 2014/0164113 A1 * | 6/2014 | Ramer et al. |
| 2014/0314215 A1 * | 10/2014 | Duva .................. H04M 3/4878 379/265.09 |
| 2014/0335822 A1 * | 11/2014 | Jain ..................... H04L 65/1069 455/566 |
| 2016/0173693 A1 * | 6/2016 | Spievak ............. G06Q 30/0269 379/265.09 |
| 2018/0018705 A1 * | 1/2018 | Tognetti ............. G06Q 30/0269 |

OTHER PUBLICATIONS

Extended European Search Report for related European Application No. 18847378.9; report dated Apr. 16, 2021; 8 pages.
International Written Opinion for related International Application No. PCT/US2018/047374; report dated Nov. 7, 2018; (5 pages).

* cited by examiner

METHODS AND SYSTEMS FOR ONLINE TO OFFLINE CONVERSION TRACKING AN OPTIMIZATION

This application claims priority to U.S. Provisional Patent Application No. 62/548,166 filed Aug. 12, 2017, the disclosure of which is hereby incorporated by reference in its entirety.

TECHNICAL FIELD

Aspects of the present disclosure relate to computing devices and hardware involved in generating and monitoring web-based invitational content that initiates or and monitors various call-based communications, such as voice calls.

BACKGROUND

Typically, closed-loop e-commerce transaction tracking technologies only allow for online tracking of user behavior. For example, such technologies may track and monitor a user's interaction with advertising content presented on a webpage to determine whether the webpage and presented advertising content is leading to fully executed and/or completed e-commerce transactions.

The ability to correlate web activity and/or online activity with offline transaction activities performed by a user, such as voice-based communication transactions presents challenges.

It is with these problems, among others, that aspects of the present disclosure where conceived.

SUMMARY

The present disclosure involves systems, methods, and non-transitory computer-readable mediums for call conversion. The systems, methods, and non-transitory computer-readable mediums involve identifying, using a computing device, web content embedding an advertising campaign for presentation to a user. The systems, methods, and computer-readable mediums further involve integrating, using the computing device, a phone number into the web content to enable monitoring of user interactions of the user when interacting with the web content. The systems, methods, and computer-readable mediums involve obtaining, at the computing device, voice communication data indicative of an offline transaction associated with the advertising campaign embedded in the web content, the voice communication data generated from a call established based on the phone number integrated in the web content.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
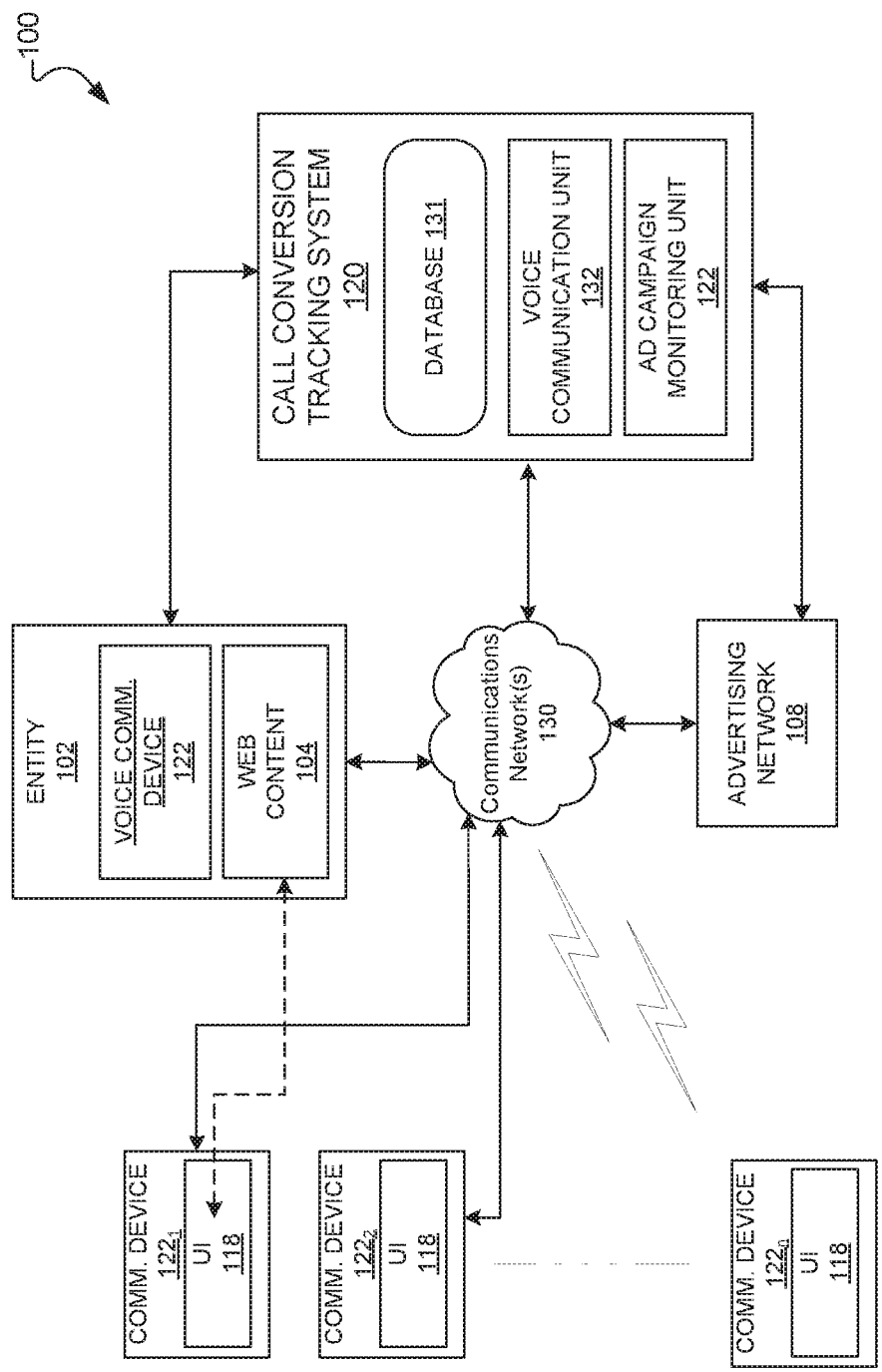
FIG. 1 is a block diagram illustrating a network computing environment for generating and monitoring web-based invitational content that initiates or otherwise triggers call-based communications, according to aspects of the present disclosure.

Aspects of the present disclosure involve a call conversion tracking system that automatically tracks call-based communications initiated from web-based invitational content and generates various data analytics for assessing the effectiveness of the web-based content (e.g., an advertisement) to initiate or otherwise trigger the call-based communication (e.g., a phone call) and/or other type of voice communication. For example, online advertisers are typically interested in understanding how well their online advertising campaigns (e.g., web-based interactive advertisements) generate sales leads and/or generate actual sales for the products and/or services for which the campaigns are advertising. In many instances, such advertisers will convert a sale over some type of voice communication, such as a phone call. It is often the case that customers who pick up the phone and make a call after viewing an online advertisement are more likely to make a purchase than customers who only interact with the advertisement online.

Typical closed-loop e-commerce transaction tracking technologies (e.g., using Google Adwords as an advertising channel) only allow for online tracking of user behavior. Stated differently, such conventional technologies only allow for the tracking of a user's interactions when interacting with advertising content presented online. Such technologies, however, typically cannot track when a user interacts with an online advertising campaign and subsequently engages in an offline activity, such as a voice communication (e.g., make a call) after interacting with the online advertising campaign. Moreover, existing techniques that attempt to enable e-commerce transaction tracking to offline activities (i.e. call based) are technically and functionally limited because they only use a "channel" based approach that associates different phone numbers with the specific advertising channel that drove the call. So this could be as broad as using "Google" as a channel to represent all Google search traffic or more granular, down to the Campaign, AdGroup, Ad or Keyword level.

The technical limitations surrounding all of these existing methods and systems is that these types of technologies aggregate the call data at a general and high-level and do not attribute any call-based activity to a specific "click (or tap) instance" that represents the exact moment and the exact data (e.g., image, audio, multimedia, application, webpage) that drove the interaction (i.e., the interaction that caused the user to engage in the call).

Aspects of the present disclose solve the specific technical problems recited above, among others, by generating or otherwise providing a closed-loop system of connecting online advertising campaigns and specific advertising content with the offline activities, such as called-based sales/conversations. In various aspects, the system generates and presents a web-based (or mobile app, in-video, or other digital) invitation that includes or otherwise integrates a dynamically assigned telephone number or other unique identifier capable of triggering a voice communication such as a call. The dynamic phone number is not assigned to a specific advertising medium, campaign or advertisement, but rather is assigned to the anonymous web visitor with all of the incoming advertising metadata that is usually sent to a web server when a user clicks (or taps) an online ad, thereby identifying the specific user click. Before the present application, no system existed that is technically capable of generating a closed-loop and automatic method of capturing both the call and the actual sales related data at the "click-level" with no additional work to be done by a human administrator.

In other aspects, the call conversion tracking system may automatically identify calls or other voice communications initiated as a result of a user interacting with a particular invitational web-content or portion of invitational web content, such as an advertisement. In particular, the call conversion tracking system associates initiated phone calls with user interactions occurring at the invitational content. For example, a telephone number may be embedded in or otherwise integrated into invitational web content, such as a web page. A user visits the web page, triggering a request to be sent to a database of the call conversion tracking system. The authenticity of the request is verified and a new entry in a storage of the call conversion tracking system is generated. The new entry may include a unique code (e.g., a numeric code) that may be transmitted back to the web content and displayed as a phone extension. As the user navigates the web page, the current page URL associated with the phone extension may be updated. When the user initiates a voice communication by calling the phone number, the user may be prompted to provide the extension, which may be used to retrieve the invitational web content associated with that extension. In response, a new record having a record ID may be recorded in storage of the call conversion tracking system. When the embedded phone number is dialed and that extension is entered during a voice communication and/or call session, the call conversion tracking system may automatically determine that particular user activities resulted in the phone call being initiated.

Two scenarios in which invitational web content, such as an online advertisement, may result in a phone call are: 1) a scenario in which a user sees an online advertisement and calls a phone number included in the advertisement; and 2) a scenario in which a user interacts with an online advertisement, accesses a website corresponding to the advertisement within a certain time period, identifies a phone number on the website, and calls the phone number. In either scenario, there may be challenges associated with determining the effectiveness of the advertisement. For example, it may be a challenge determining how to relate a particular call to a particular ad impression/query without using a separate number for each keyword or each ad impression. Second it may be a challenge determining how to incorporate phone calls into a measurement of an advertisement's quality or effectiveness. In general, an advertisement that causes a user to make a phone call to an advertiser is substantially more valuable to the advertiser than an advertisement that causes the user to click on the advertisement. The disclosed call conversion tracking system solves such challenges by automatically ensuring that a user's interaction with invitational web content (e.g., an online advertisement) is recorded and associated with any voice communications that are established (e.g., a phone call) as a results of the user's interaction with the invitational web content. Although the various examples described herein involve web-based invitational content, it is contemplated that any type of content, such as digital content, application content, and/or the like, involved with advertising campaigns may be used.

The call conversion tracking system disclosed herein may be used to assess the effectiveness of a web-based invitational content (e.g., an advertisements), that integrate a phone numbers, ability to cause a user to engage in an actual sale transaction. In one specific example, the call conversion tracking system may be used to evaluate the performance of different keywords in generating calls to displayed phone numbers integrated in the web-based invitational content. More specifically, the call conversion tracking system implements various algorithms that automatically correlate received calls and/or displayed phone numbers with the keyword(s) associated with the web-based invitational content. Stated differently, the call conversion tracking system gives advertisers the ability to track and measure which keywords drive sales for consumers based on calls initiated directly from the web-based invitational content displaying the phone number(s). In some embodiments, the system uses the calculated effectiveness of certain keywords to automatically recommend new web-based invitational content (i.e., new advertisement campaigns) for display to users.

FIG. 1 illustrates one example of a computer network 100 (e.g., a telecommunications network) that may be used to implement various aspects of the present disclosure. Generally, the computer network 100 includes various devices communicating and functioning together in the gathering, transmitting, requesting, and/or data related to associating user interactions with invitational web content with voice communications, such as a phone call. As illustrated, a communications network 130 allows for communication in the computer network 100. The communications network 130 may include via or more wireless networks such as, but not limited to one or more of a Local Area Network (LAN), Wireless Local Area Network (WLAN), a Personal Area Network (PAN), Campus Area Network (CAN), a Metropolitan Area Network (MAN), a Wde Area Network (WAN), a Wireless Wde Area Network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, LTE networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols. Network 130 may also include wired networks.

An entity 102 (e.g., a business, organization, group of people, governmental agency, etc.) that is responsible for providing invitational and/or interactive web content 104 to users, such as for example an online advertisement, in an attempt to attract business or attention from the user. In one specific embodiment, invitational web content 104 may include one or more advertisements. In such a scenario, the entity 102 may connect with an advertising network 108 to provide such advertisements to users. To specify how advertisements are distributed, the entity 102 may generate an ad campaign with the advertising network 108. In one specific example, Ad campaigns may be specified by some or all of the following parameters: campaign name (e.g., name or theme for advertising), type of advertisement (e.g., search only, display only, search and display), network where the ad will appear (e.g., on GOOGLE or on non-GOOGLE sites), devices that should receive the ad (e.g., desktops, tablets, and mobiles), languages and locations where the ad may be displayed, bidding and budget strategy associated with the ad (e.g., bid strategy specifies how much an advertiser is willing to pay for users to interact with ads), and available ad formats (e.g., text ad, image ad, rich media ad, videos). Each ad campaign has one or more advertisements.

The web content including advertisements are displayed to one or more comm. devices $122_1$, $122_2$,-$122_N$, which may be may be a personal computer, work station, mobile device, mobile phone, tablet device, processor, and/or other processing device capable of implementing and/or executing processes, software, applications, etc., that includes network-enabled devices and/or software, such as a user-interface 118 for communication over the communications network 130 (e.g., browsing the internet). Additionally, the one or more comm. devices $122_1$, $122_2$,-$122_N$, may include one or more processors that process software or other machine-readable instructions and may include a memory to store the software or other machine-readable instructions and data. In the illustrated embodiment, the advertisements are displayed via the web content 104 provided by the entity 102. However, it is contemplated that the documents may be displayed alone or in documents, messages, emails and/or other sources of electronic content other than the web content 104. In one specific arrangement, the one or more comm. devices $122_1$, $122_2$,-$122_N$ may be capable of establishing phone calls and may be connected to a Public Switched Telephone Network (PSTN) 141 configured to process calls in conjunction with the call conversion tracking system 120.

In an illustrative usage scenario, a user accesses web content 104 of the entity 102, by interacting with the UI 118 of the one or more comm. devices $122_1$, $122_2$,-$122_N$. The user is motivated to initiate a voice communication to the voice communication device 122 of the entity 102 base on, for example, an advertisement included in the web content 104 displayed in the UI 118. While the example above describes a user's interaction with a web page, it is contemplated that the user's decision to initiate a voice call may be motivated by network-based content other than a website that the user accesses, such as an e-mail, video, and/or any other network-accessible content provided by the entity 102. The voice call can be established using the communications network 130, or other network in communication with the communications network 130.

A call conversion tracking system 120, including one or more processor(s) 122, communicates with the entity 102 and the advertising network 108. In some embodiments, the call conversion tracking system 120 receives details about one or more ad campaigns included in the web content 108 provided by the entity 102. For example, the call conversion tracking system 120 may receive or otherwise collect information including phone numbers associated with an advertising campaign, keyword lists, bidding strategy, and advertising distribution network preferences from the advertising network 108 and/or the entity 102. Additionally, the entity 102 can provide internal advertiser information that was not provided to the advertising network regarding the ad campaign. For example, the internal advertiser information may include call data such as the number and time of received calls to the advertiser via different phone numbers. Internal advertisers may also include bidding information for ad campaigns or call data such has who spoke with consumer.

In some embodiments, the call conversion tracking system 120 may receive metric data from advertising networks 108. Metric data includes, for example, the number of ad impressions, the click-through rate on advertisements, and average cost paid per advertisement for an advertisement campaign provided in the web content 104 of the entity 102. As will be described in additional detail herein, by correlating the metric data with the voice communication data, the call conversion tracking system 120 may automatically determine the effectiveness of ad campaigns in generating calls to displayed numbers. Based on such determinations, the call conversion tracking system 120 may automatically generate recommendations of improvements to the ad campaigns.

Figure 2:
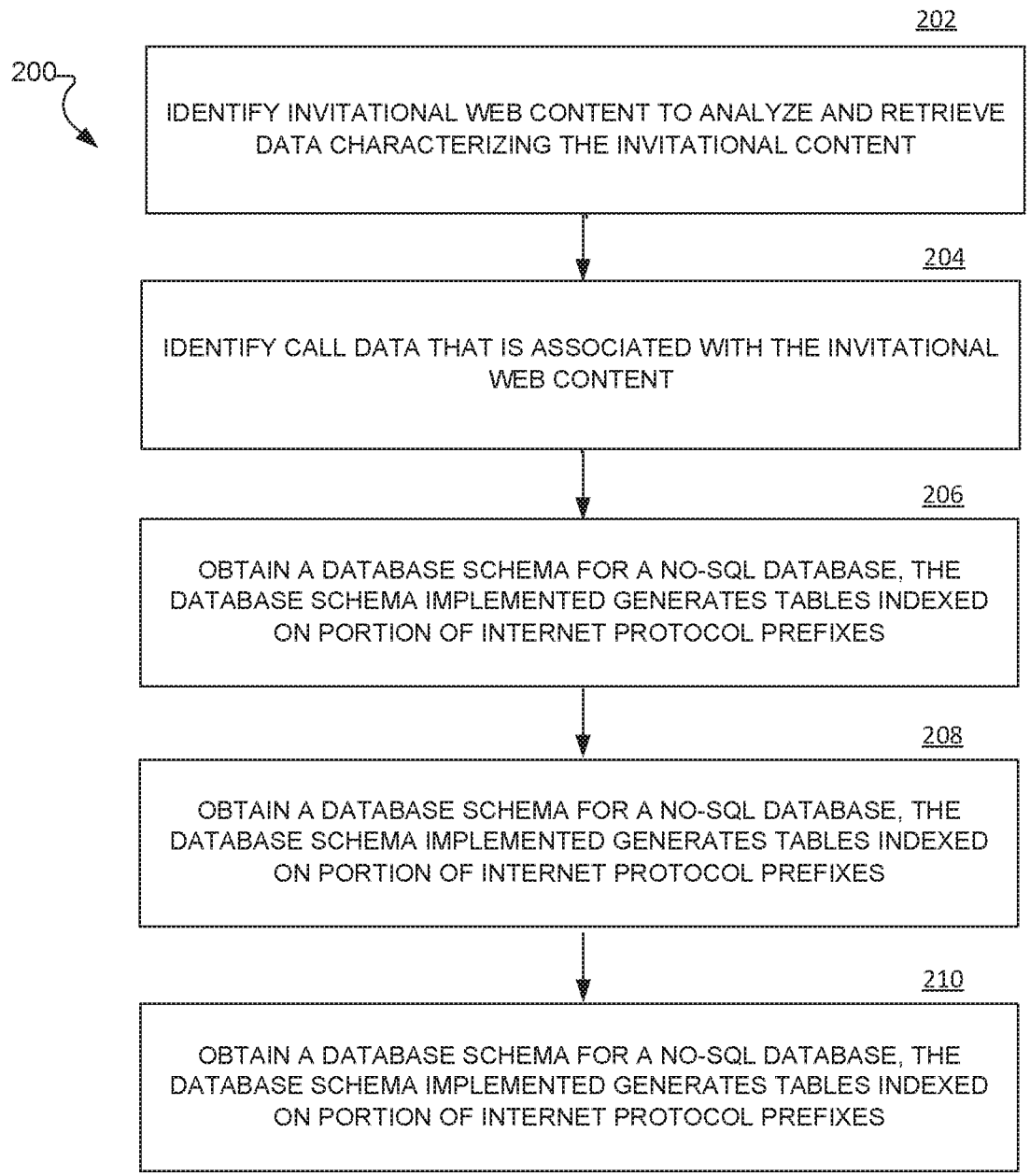
FIG. 2 is a flowchart of an example call-based conversion process, according to aspects of the present disclosure.

Referring now to FIG. 2 and with reference to FIG. 1, an illustrative call-based conversion process 200 implemented by the call conversion tracking system 120 is provided. The process 200 may be implemented and/or executed by the computing network 100 of FIG. 1. The process 200 begins at 202, wherein a call conversion tracking system 120 identifies and selects invitational web content, such as a web page, currently being presented to users and retrieves data characterizing an advertising campaign associated or otherwise integrated in the identified invitational web content. In one specific example, the call conversion tracking system 120 may identify an advertising campaign from the invitational web content and retrieve the keywords used in the ad campaign (which may span one or more ad groups), network information, unique identification information corresponding to the invitational content and/or the advertisement(s), and/or phone numbers corresponding to the advertising campaign. In another example, the call conversion tracking system 120 may identify metadata used to identify and integrate the ad campaign into the web content.

In the event that the advertising network 108 is responsible for generating the ad campaign, the call conversion tracking system 120 may receive the unique ID associated with the ad campaign and/or the invitational web content integrating the advertisements and ad campaign. In any scenario, the call conversion tracking system can uniquely identify and associate invitational web content, its integrated ad campaigns, and a user's interactions with the ad campaign.

In another embodiment, the call conversion tracking system 120 may receive such ad campaign information from the advertising network 108 and/or the entity 102. In retrieving the data for analysis, the call conversion tracking system 120 may receive the phone numbers from the advertising network 108 and/or the entity 102. Alternatively, the call conversion tracking system 120 may have provided the phone numbers to the advertisers for use as call tracking numbers, which allows for the call conversion tracking system 120 to directly collect metric data.

In step 204, the call conversion tracking system 120 modifies the invitational web content associated with the ad campaign and/or advertisements to enable tracking and monitoring by the call conversion tracking system. Specifically and in one example, the call conversion tracking system 120 automatically integrates within and/or otherwise associates a phone number, or other unique identifier capable of triggering a call, with specific portions of web-based invitational content.

Figure 3:
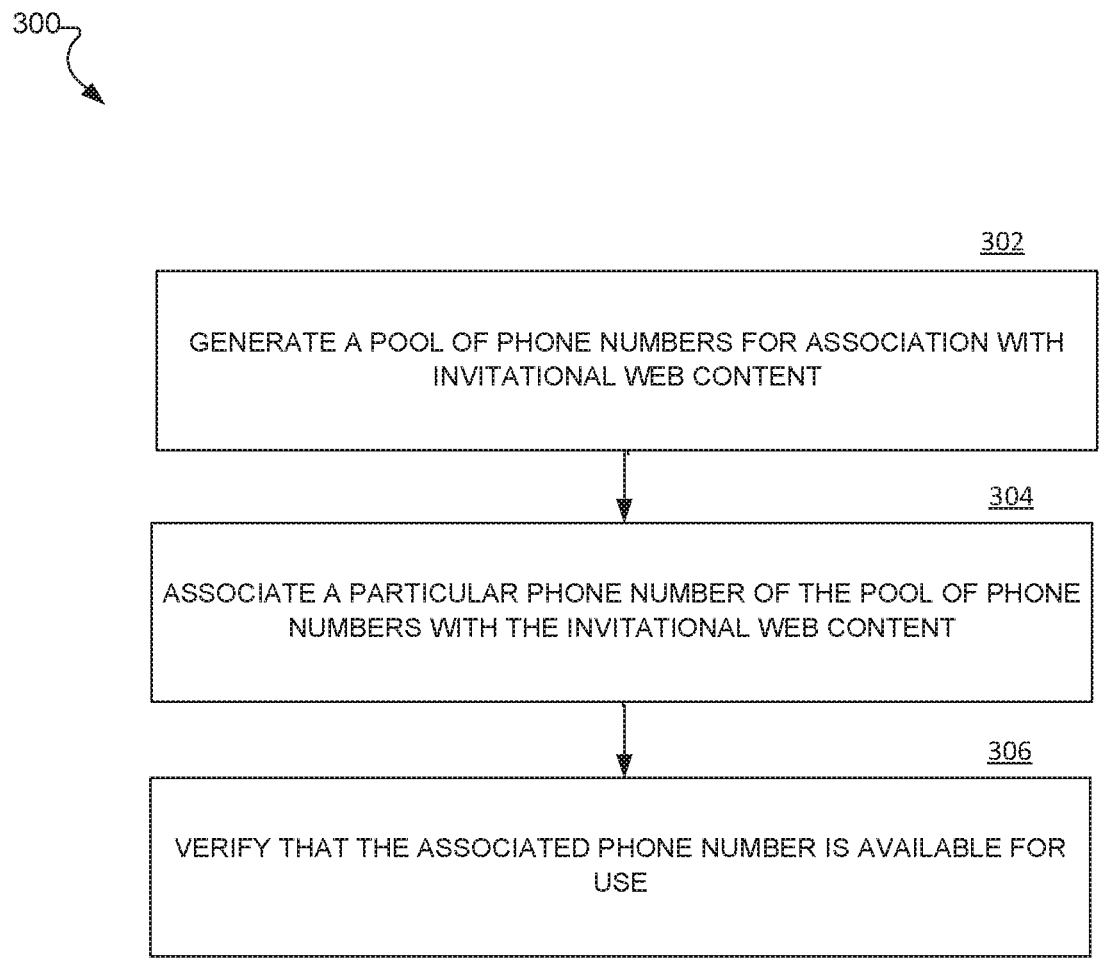
FIG. 3 is a flowchart of an example process for generating phone numbers for use in call-based conversion tracking, according to aspects of the present disclosure.

FIG. 3 provides an example of an illustrative process 300 for associating a telephone number with web based invitational content, according to aspects of the present disclosure.

As illustrated, process 300 begins, at step 302, with generating a pool of available phone numbers for association with a given piece of web-based invitational content. In one specific example, the call conversion tracking system 120 may initially generate a pool of phone numbers that is sufficiently large enough to accurately track a number of users and their corresponding interactions with various advertising campaigns. The pool of numbers may be generated using an algorithm executed by the call conversion tracking system 120 with inputs including number of daily website visitors, number of daily calls, average time between web visit and call, average call duration, among other inputs. Based on these inputs, the system generates a pool of (e.g., random) phone numbers, each of which can be integrated within and/or otherwise associated with specific portions of web-based invitational content that may be accessed by users.

At step 304, one or more of the generated phone numbers are associated with a web-based invitational content. In one specific example, the web-based invitational content may include content in any of a number of formats, including text, graphics, audio, video, audio-video, or other media. Accordingly, a phone number may be integrated or otherwise embedded within such content dynamically and in real-time.

In one specific example, inserting the phone number dynamically may involve the moving and resizing of components of web content currently being displayed to users at the one or more comm. devices $122_1$, $122_2$, $-122_N$, based on dynamic layout triggers. Such triggers may include content changes, multiple target platforms (display of the application using different technologies on different viewing platforms), multiple screen sizes (display of the application using a number of displays, which have different sizes and resolutions), dynamic data (use of components containing dynamic data, which changes over time), end user changes and application initiated layout changes.

In another example, the call conversion tracking system 120 may manage sessions (a session is created when one or more users request a web-page) to enable the monitoring of the activity of users viewing a web-page. Additionally, the call conversion tracking system 120 may receive data from each users communication device, as each user points on and/or interacts with web content. More specifically, the call conversion tracking system 120 executes instructions to automatically analyze a particular web content (e.g., a web page) to locate various elements within the content. In so doing, the script code may construct a data structure (e.g., a tree, heirarchical tree) of unique components according to the interrelation between and among the various identified elements stores the data structure in a database, thereby allowing the call conversion tracking system 120 identify the various elements that make-up the web content. Each element can then be precisely located by the script code so that any actions by the user (e.g., point and/or draw actions) to a particular element may be communicated by the script code to the call conversion tracking system 120.

Moreover, during the viewing of web content, in real-time, a telephone number may be integrated and/or otherwise embedded into the web content based on the data structure of unique web content components.

At 306, one or more verification conditions may be executed to determine whether a given phone number in the generated pool is available for use. In one example, the call conversion tracking system 120 may verify whether assigned number is being re-presented to a user interacting with a portion of web based invitational content. For example, the call conversion tracking system 120 may determine whether a specific number has already been associated with by a particular user or called by a particular user, and if so, flag the phone number as being re-presented to the user. Alternatively, a verification condition may be executed to determine that a phone number is currently unassigned to invitational web content and/or a specific user and thus can be returned to the pool of available phone numbers for use with a different user and/or portion of web based invitational web content. Once a phone number has been verified, it is ready for integration into web based invitational content and for calls be users.

Figure 4:
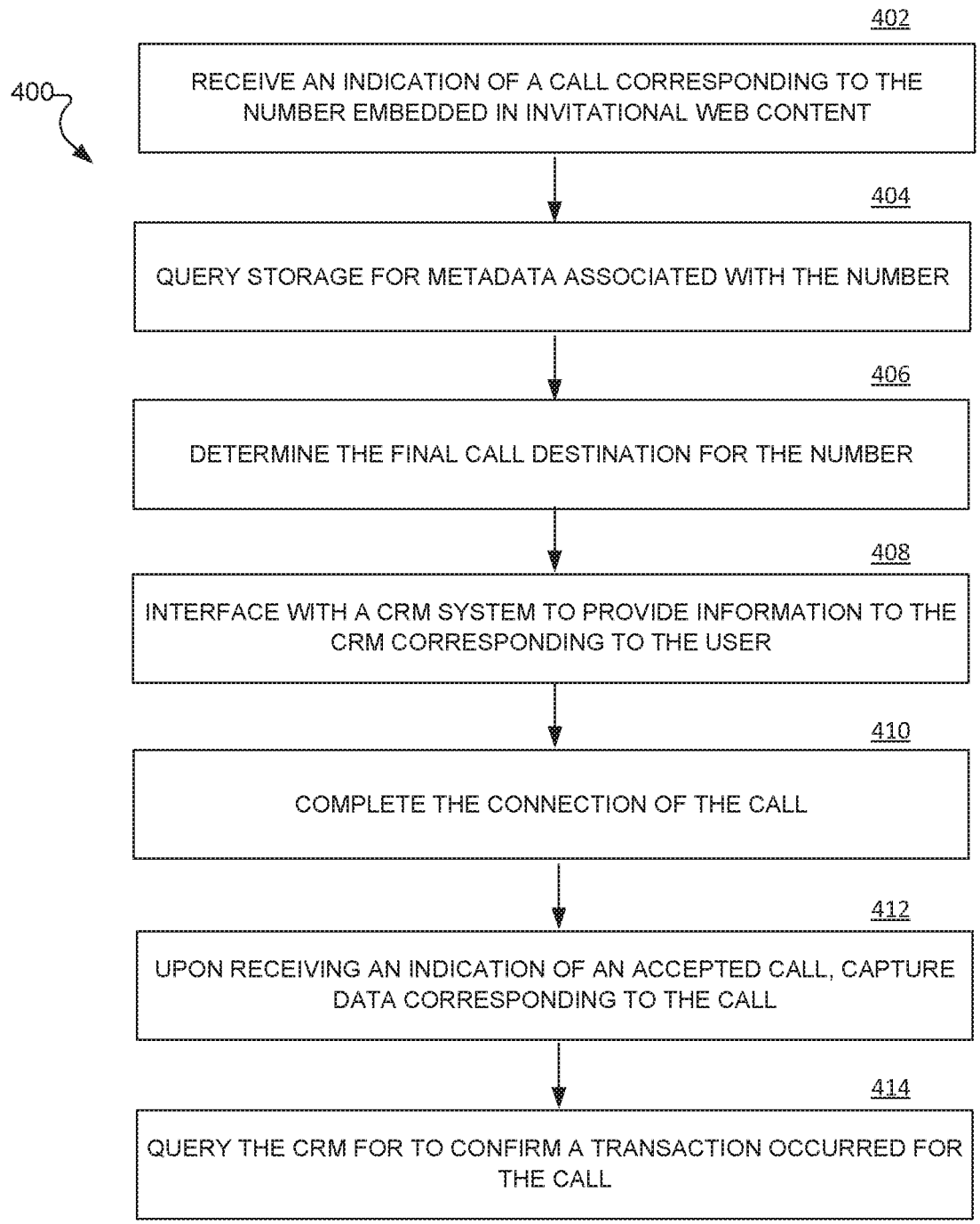
FIG. 4 is a flowchart of an example process for processing calls, according to aspects of the present disclosure.

FIG. 4 illustrates an example process 400 for processing calls received at a generated phone number, according to aspects of the present disclosure. Process 400 begins at step 402 with receiving an indication of a call at a phone number that has been placed in web based invitational content. At step 404, the phone call is initially connected or otherwise established at the call conversion tracking system 120, which looks up in a database, the web session metadata associated with the last assignment of that phone number and stores the incoming caller id of the users mobile device (or other device) making the call.

At 406, the call conversion tracking system looks up from the database the final call destination (e.g., either via POTS, "Plain Old Telephone Service" or SIP, Session Interchange Protocol") of the call based either as a global setting or specific assignment using various criteria like lead score, inbound channel, pages on site viewed, among others.

At 408, while the call conversion tracking system 120 is connecting the call, the call conversion tracking system 120 may connect to a customer relationship management ("CRM") system, which may include any customer relationship management, contact management, call center management or other system of record where leads and/or customer data is stored) and insert or update a record to include the known information about the caller. Such information may include inbound caller id, unique tracking number (from the call conversion tracking system), online advertising tracking metadata, web pages viewed and in some cases will include augmented record detail from internal or external systems. For example, the system may connect to the CRM 131 of the entity 102. Although the CRM 131 is located at within the entity 102, it is contemplated that the CRM may be located external to the entity 102 and elsewhere within the computer network 100, such as within the At step 410, the call conversion tracking system 120 will complete the connection of the call to the final call destination. The destination may be an IVR (interactive voice response) system, a phone extension, a call group or other vehicle for distributing calls to various end users, such as sales agents.

At 412, when a sales agent accepts the call, the call conversion tracking system 120 may engage a series of steps to capture the accepted call. In one example, if the call center is equipped with CTI (computer telephony integration), the known record for the user will be displayed to the sales agent as they answer the call. If the call center is not equipped with CTI, the call conversion tracking system 120 will communicate a record locator id via one-sided audio communication the sales agent.

If the call center is not equipped with any form of CRM, the call conversion tracking system 120 will generate and provide a web-based interface to locate and update call records. During the duration of the call, the sales agent will use their normal tools to record a sale.

At 414 after the sale is complete if the call center is equipped with a CRM, the call conversion tracking system 120 will query the CRM for the final status of the sale and its value. If the call center is not equipped with a CRM, the sales agent may be prompted via one sided audio to confirm that a sale did or did not occurred by entering a numeric value via touch tone a. If a sale did occur, the sales agent will be further prompted via one-sided audio to enter the value of the sale in whole numbers via touch-tone. In addition or in place of the method described above, the agent may log into the call conversion tracking system 120 and manually enter the sale value via a web-based interface. On a time schedule, the call conversion tracking system 120 will collect the sales values and transmit them to a multitude of advertising platforms (like Adwords, Facebook, etc) and/or analytics platforms (like Google Analytics, Omniture, etc). Once the data is transmitted to the advertising and/or analytics platforms the call conversion tracking system 120 may update the CRM to indicate that the sales that have been connected to online activities have been uploaded. By communicating specific sales and value data to advertising platforms with a precision similar to ecommerce transactions, the advertising platforms can use their internal optimization systems to improve the quality of advertising for future digital advertising interactions.

Referring again to FIG. 2, in step 206, the call conversion tracking system 120 obtains voice communication data (e.g., phone call data) that is associated with advertisements and/or ad campaigns associated with the invitational web content. In particular, the call conversion tracking system 120 identifies all voice communications with telephone numbers that are associated with the ad campaign integrated in the identified invitational web content. More specifically, the voice communication unit 132 logs the voice communication against the unique code associated with the invitational web content, and creates a database record in the database 130, or a record in the entity 102 and forwards the established voice communication to the voice communication device 122.

In step 208, based on the voice communication data, a customer relationship management ("CRM") and/or other type of ordering software interface may be generated and transmitted to the entity 102. In one embodiment, the CRM may be auto-populated with user information based on the voice communication data. The generated CRM enables execution of a sale or business transaction based on the data populated in the CRM.

At 210, a transaction identifier indicating the completion of a sale transaction is stored at the database 130 of the call conversion tracking system 120. In some instances, the call conversion tracking system 120 may provide the data to the entity 102 for review and analysis.

In decision step 210, the call conversion tracking system 120 determines whether additional advertising campaigns should be analyzed. If additional campaigns remain to be analyzed, processing continues again at step 202 with data associated with a different invitational content. Otherwise, processing ends.

In some cases, a user may start their interaction with the web-based invitation to respond on one device (such as a mobile smartphone or tablet) and then move to a different device (such as a desktop computer). In these cases it is possible that the linkage between online advertisement and phone call can be broken. To address the data break, the present system uses a cross-device attribution mechanism to automatically connect to distinctly different web sessions, but can be modeled to have similar data by using data points such as web browsing history, date/time stamp of interactions, geo-location analysis of both online and call behavior (possibly using geo understanding of inbound caller id as a model factor as, well as others.

In some cases, the online advertising may generate excessive call volume and overwhelm the available call center staff. The may result in long call hold times and even risk losing calls which cost the advertiser significant money. To address this, the current disclosure also covers the communication between the call conversion tracking system 120 and the call center operations system (which manages call distribution, etc.) and may have visibility into the state of available agents. In cases where the call conversion tracking system 120 determines that the number of available call center agents (to take calls) is approaching (or has achieved) full capacity, the call conversion tracking system 120 may communicate to the online advertising platforms (like Google, Facebook, etc) and adjust factors in the active campaigns (like status [i.e. pause the campaign], budget, bid level and other factors that may reduce or temporarily halt the inbound call volume) to reduce lost calls. Additionally, the call conversion tracking system 120 may continue to monitor the call center operations system to determine that agents have become available and that the online advertising campaigns should have their adjusted factors returned to normal. In some embodiments of the current disclosure, the call conversion tracking system 120 may include artificial intelligence and machine learning to create prediction models to more effective manage the interaction between the call conversion tracking system 120 and the digital advertising platforms based on the data monitored from the call center operations system.

In yet other scenarios, the call conversion tracking system 120 may employ artificial intelligence and machine learning to more effectively identify factors driving successful sales. These factors may include effective ad's, keywords, geographies, landing pages, etc. In cases where there is clear content associated with enhanced sales (like keywords, ads, landing pages), the call conversion tracking system 120 may make content suggestions based on these findings, which may improve the search engine optimization (seo) of the web-based invitation or other web-based or ad content.

Figure 5:
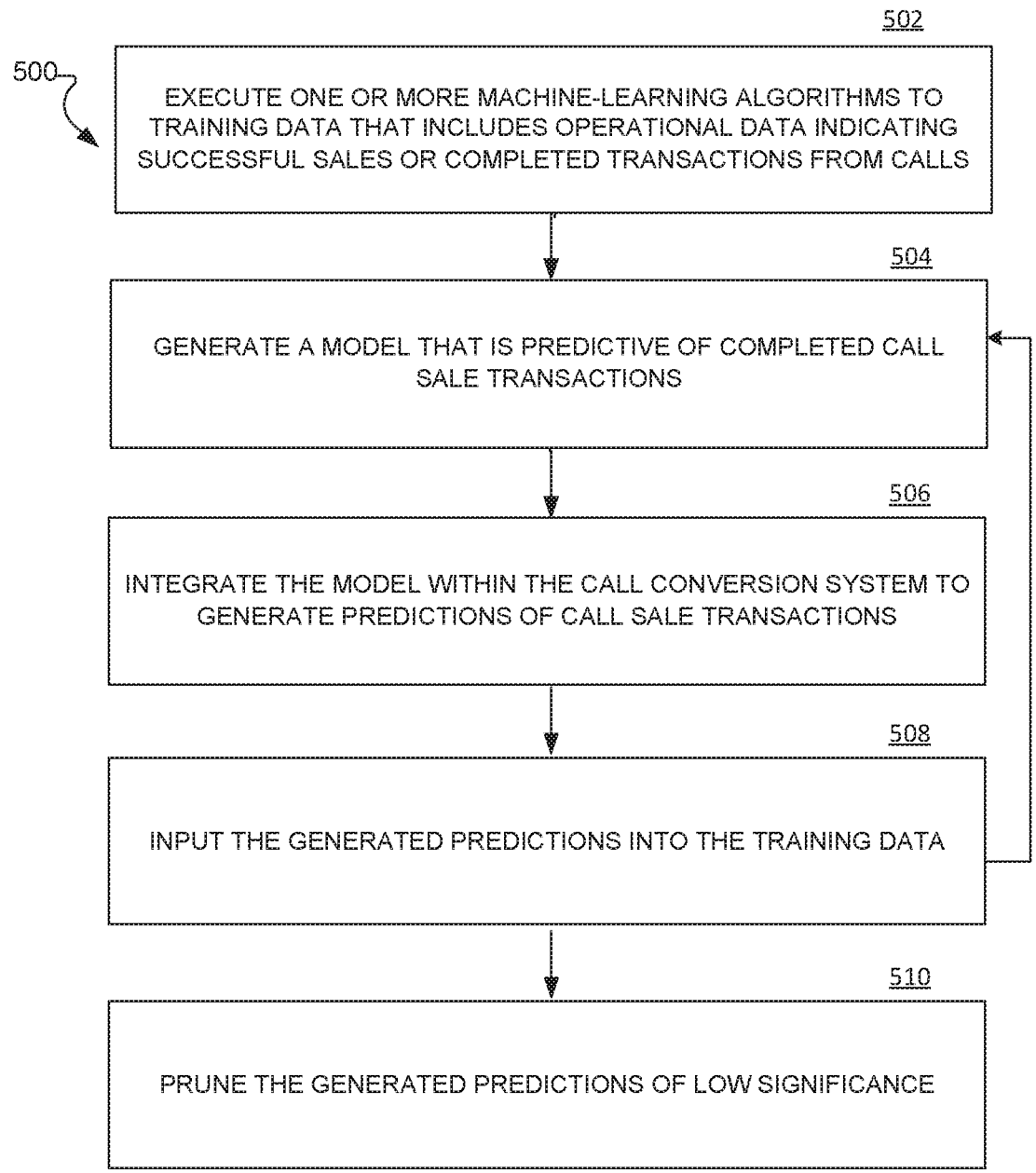
FIG. 5 is block diagram illustrating an example process for generating a predictive model for call conversions using machine-learning mechanisms, according to aspects of the present disclosure.

FIG. 5 illustrates and example process 500 for generating and/or executing a predictive model that predicts whether a call triggered from web content will be converted to a sale or executed e-commerce transaction. As illustrated in FIG. 5, process 500 begins at 502 with executing one or more machine-learning algorithms to training data that includes operational data indicating successful call-based sales or completed transactions based on calls for a specific period of time. In some instances, the operational data of the training data may include one or more independent variables or parameters that associate certain characteristics of call transactional data that drive successful sales or call transactions. For example, the independent variables may include ad's, keywords, geographies, landing pages on. The training data may include an extremely large (not human processable) data set defining the successful transactions. The training data may further include validation data that identifies prior outcomes for such variables. Example machine-learning techniques that may be applied include linear regression, non-linear regression, Bayesian modeling, Monte Carlos methods, neural networks, random forest, k-means clustering, among others.

At 504, the machine-learning mechanism identifies correlations between a set of independent variables (e.g., predetermined or automatically identified) and call transaction outcomes, for example using linear regressions. Thus, the call conversion system 120 is trained to generate a set of algorithm constants, which when applied to a real-time set of call transaction data, automatically generates a model that is predictive of call transaction success.

At 506, the generated model is installed or otherwise integrated within the call conversion system 120 and executed to generate predictions of call transactions for a specific period of time.

At 508, in some instances, the results (i.e., the predicted determinations) of executing the generated model(s) are automatically fed back into the training data (operation 508). For example, new predictions of call transaction data may be copied into training data. Then, the training process (operation 504) may be repeated and thereby incorporate the new predictions into the predictive model generation process. In some instances, new classification mechanisms and/or correlations may be identified and incorporated into any generated models, in view of the supplemented training data. The updated and/or newly generated models may be executed by the call conversion system 120 and utilized for further predictions.

At 510, the processed training data and generated predictions are stored (and continuously stored) into the database 220. In some instances, the stored training data and predictions maybe pruned of data that is of low significance. More specifically, call sale predictions may be within the training dataset, which have not been observed a sufficient number of times to have statistically significant outcome associations. In such instances, it may be desirable to prune those trajectories of low significance, such as by removing from the larger dataset.

In some cases, the call conversion tracking system 120 may integrate with ad servers that deliver display and/or video ads to improve the trackability of these ad units when driving calls. To address this, the current disclosure also cover the creation of a new or modified ad tag (the code used to deliver display ads on website, mobile aps and/or video services) and bring the same level of dynamic phone insertion described in 1 to these ad units delivered and displayed on web pages (or aps, etc) different from the web-based invitation content.

In some cases, the call conversion tracking system 120 may use the data collected (like tendency to respond via phone or sales success) to create digital marketing audiences.

In some cases, the call conversion tracking system 120 may use the data collected (possibly with artificial intelligence and machine learning) to analyze the sales effectiveness of digital advertising across digital advertising platform and either make suggested changes to optimize performance or in some cases automatically make the changes directly.

In some cases, the call conversion tracking system 120 may use the data collected (possibly with artificial intelligence and machine learning) to analyze the sales effectiveness of digital advertising across digital advertising platforms and either make suggested changes to optimize performance or in some cases automatically make the changes directly.

In some cases, the call conversion tracking system 120 may use the data collected (possibly with artificial intelligence and machine learning) to analyze the sales effectiveness of ad performance within and/or across digital advertising platforms and either make suggested changes to optimize performance or in some cases automatically make the changes directly.

In some cases, the call conversion tracking system 120 may use the data collected (possibly with artificial intelligence and machine learning) to analyze the sales effectiveness of ad position (like actual position or content context, etc) within and/or across digital advertising platforms and either make suggested changes to optimize performance or in some cases automatically make the changes directly.

In some cases, the call conversion tracking system 120 may use the data collected (possibly with artificial intelligence and machine learning) to analyze the sales effectiveness of ad content and/or call to action within and/or across digital advertising platforms and either make suggested changes to optimize performance or in some cases automatically make the changes directly.

In some cases, the call conversion tracking system 120 may use the data collected (possibly with artificial intelligence and machine learning) to analyze the sales effectiveness of keyword or targeting criteria within and/or across digital advertising platforms and either make suggested changes to optimize performance or in some cases automatically make the changes directly.

In some cases, the call conversion tracking system 120 may use the data collected (possibly with artificial intelligence and machine learning) to analyze budget effectiveness within and/or across digital advertising platforms and either make suggested changes to optimize performance or in some cases automatically make the changes directly.

In some cases, the call conversion tracking system 120 may use the data collected (possibly with artificial intelligence and machine learning) to analyze the sales effectiveness sales reps when receiving calls within and/or across digital advertising platforms and either make suggested changes to optimize performance or in some cases automatically make the changes directly.

In some cases, the call conversion tracking system 120 may use the data collected (possibly with artificial intelligence and machine learning) to analyze return on investment maximization (possibly including increasing or decreasing budgets) within and/or across digital advertising platforms and either make suggested changes to optimize performance or in some cases automatically make the changes directly.

Figure 6:
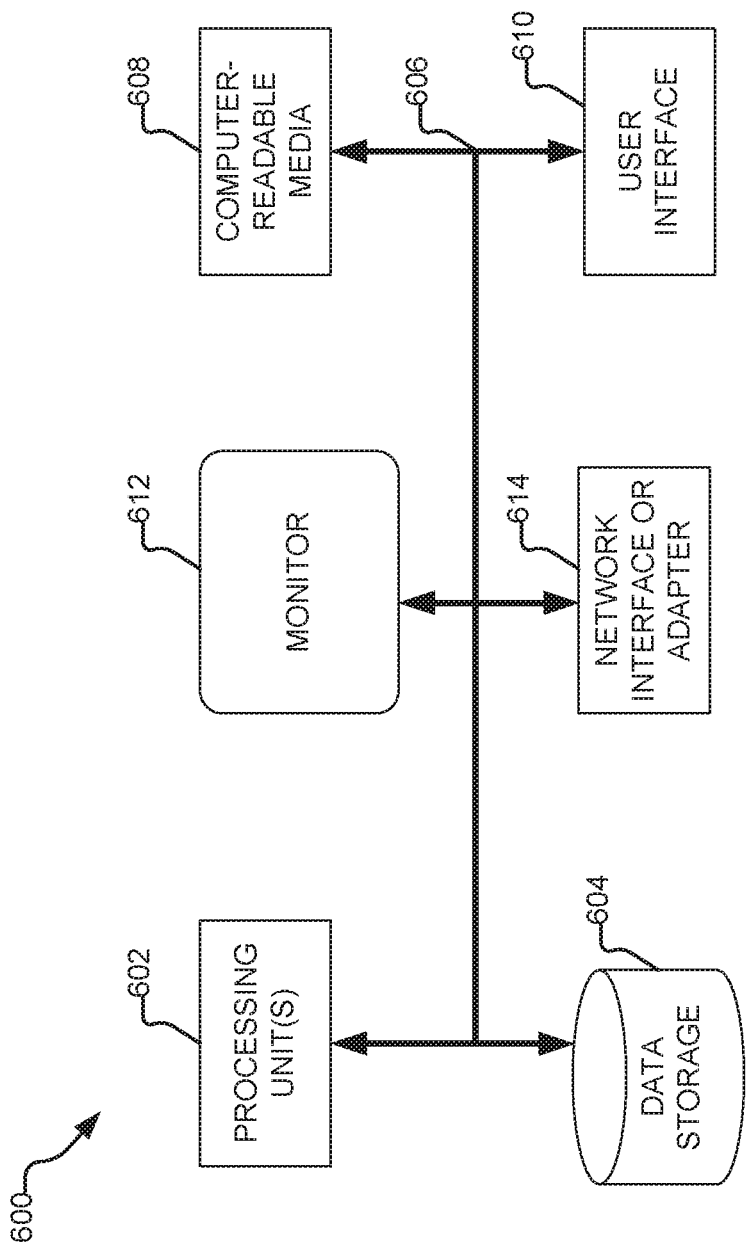
FIG. 6 is a block diagram illustrating a computing device specifically implemented to automatically track call-based communications, according to aspects of the present disclosure.

FIG. 6 illustrates an example of a suitable computing and networking environment 600 that may be used to implement various aspects of the present disclosure described in FIGS. 1-4, such as the call conversion tracking system 120. As illustrated, the computing and networking environment 600 includes a general purpose computing device 600, although it is contemplated that the networking environment 600 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 600 may include various hardware components, such as a processing unit 602, a data storage 604 (e.g., a system memory), and a system bus 606 that couples various system components of the computer 600 to the processing unit 602. The system bus 606 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 600 may further include a variety of computer-readable media 608 that includes removable/non-removable media and volatile/nonvolatile media, but excludes transitory propagated signals. Computer-readable media 608 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 600. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 604 includes computer storage media in the form of volatile/nonvolatile memory such as read only memory (ROM) and random access memory (RAM). A basic input/output system (BIOS), containing the basic routines that help to transfer information between elements within the computer 600 (e.g., during start-up) is typically stored in ROM. RAM typically contains data and/or program modules that are immediately accessible to and/or presently being operated on by processing unit 602. For example, in one embodiment, data storage 604 holds an operating system, application programs, and other program modules and program data.

Data storage 604 may also include other removable/non-removable, volatile/nonvolatile computer storage media. For example, data storage 604 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 6, provide storage of computer-readable instructions, data structures, program modules and other data for the computer 600.

A user may enter commands and information through a user interface 610 or other input devices such as a tablet, electronic digitizer, a microphone, keyboard, and/or pointing device, commonly referred to as mouse, trackball, or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 602 through a user interface 610 that is coupled to the system bus 606, but may be connected by other interface and bus structures, such as a parallel port, game port or a universal serial bus (USB). A monitor 612 or other type of display device is also connected to the system bus 606 via an interface, such as a video interface. The monitor 612 may also be integrated with a touch-screen panel or the like.

The computer 600 may operate in a networked or cloud-computing environment using logical connections of a network interface or adapter 614 to one or more remote devices, such as a remote computer. The remote computer may be a personal computer, a server, a router, a network PC, a peer device or other common network node, and typically includes many or all of the elements described above relative to the computer 600. The logical connections depicted in FIG. 6 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 600 may be connected to a public and/or private network through the network interface or adapter 614. In such embodiments, a modem or other means for establishing communications over the network is connected to the system bus 606 via the network interface or adapter 614 or other appropriate mechanism. A wireless networking component including an interface and antenna may be coupled through a suitable device such as an access point or peer computer to a network. In a networked environment, program modules depicted relative to the computer 600, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A method comprising:
    identifying, using a computing device, web content for presentation to a user;
    determining, using the computing device, a data structure that includes a plurality of elements of the web content;
    determining, using the computing device, a database entry that associates the user with a phone number, a unique code, and an interaction of the user with an element of the plurality of elements of the web content;
    embedding, using the computing device, the phone number into the web content;
    embedding, using the computing device, the unique code into the web content subsequent to the user initially interacting with the web content such that the unique code is visible to the user and associated with a portion of the web content;

establishing, using the computing device, a connection for a call initiated by the user, wherein the call is initiated by the user based on the phone number and unique code embedded in the web content;

updating, using the computing device and while the connection for the call is being established, the database entry based on previously stored information associated with the user;

obtaining, at the computing device, voice communication data generated from the call such that the voice communication data is associated with the interaction of the user and with the portion of the web content, wherein the voice communication data is indicative of an offline transaction associated with the user and the web content; and determining, using the computing device, data associated with the offline transaction based on the database entry, wherein the data includes the interaction of the user and the portion of the web content.

2. The method of claim 1, further comprising:
generating, at the computing device, a graphical user-interface, wherein the graphical user-interface is auto-populated with the previously stored information which is identified from the user interactions and information corresponding to the offline transaction.

3. The method of claim 2, further comprising:
storing, using the computing device, a transaction identifier indicating completion of the offline transaction, based on a notification received at the graphical user-interface.

4. The method of claim 1, further comprising:
generating a pool of phone numbers for possible integration into the web content;
selecting the phone number from the pool of phone numbers; and
verifying that the phone number should be integrated into the web content.

5. The method of claim 1, wherein obtaining voice communication data comprises:
receiving an indication, at the computing device, indicating that the phone number was called.

6. The method of claim 1, wherein the voice communication data comprises metadata assigning the phone number to the web content and information identifying a mobile device used to establish the call.

7. The method of claim 1, further comprising:
receiving in real-time, using the computing device, metadata as the user interacts with the web content, the metadata capturing the user interactions with the web content, and wherein the metadata is associated with the unique code; and
determining, using the computing device, one or more user interactions that resulted in the initiation of the call based on the metadata associated with the unique code.

8. The method of claim 1, further comprising modifying, using the computing device, the association of the unique code with the portion of the web content such that the unique code is associated with a second portion of the web content in response to an interaction of the user with the web content that causes the portion of the web content to change to the second portion of the web content.

9. A computing system comprising:
at least one computing device, the computing system configured to:
identify web content for presentation to a user;
determine a data structure that includes a plurality of elements of the web content;
determine a database entry that associates the user with a phone number, a unique code, and an interaction of the user with an element of the plurality of elements of the web content;
embed the phone number into the web content;
embed the unique code into the web content subsequent to the user initially interacting with the web content such that the unique code is visible to the user and associated with a portion of the web content;
obtain voice communication data generated from the call such that the voice communication data is associated with the interaction of the user and with the portion of the web content, wherein the voice communication data is indicative of an offline transaction associated with the user and the web content; and
determine data associated with the offline transaction based on the database entry, wherein the data includes the plurality of interactions of the user and the portion of the web content.

10. The system of claim 9, wherein the computing system is further configured to generate a graphical user-interface, wherein the graphical user-interface is auto-populated with the previously stored information which is identified from the user interactions and information corresponding to the offline transaction.

11. The system of claim 10, wherein the computing system is further configured to store a transaction identifier indicating completion of the offline transaction, based on a notification received at the graphical user-interface.

12. The system of claim 9, wherein the computing system is further configured to:
generate a pool of phone numbers for possible integration into the web content;
select the phone number from the pool of phone numbers; and
verify that the phone number should be integrated into the web content.

13. The system of claim 9, wherein obtaining the voice communication data comprises receiving an indication indicating that the phone number was called.

14. The system of claim 9, wherein the voice communication data comprises metadata assigning the phone number to the web content and information identifying a mobile device used to establish the call.

15. A non-transitory computer readable medium encoded with instructions, the instructions executable by one or more computing devices to perform operations comprising:
identifying web content for presentation to a user;
determining a data structure that includes a plurality of elements of the web content;
determining a database entry that associates the user with a phone number, a unique code, and an interaction of the user with an element of the plurality of elements of the web content;
embedding the phone number into the web content;
embedding the unique code into the web content subsequent to the user initially interacting with the web content such that the unique code is visible to the user and associated with a portion of the web content;
obtaining voice communication data generated from the call such that the voice communication data is associated with the interaction of the user and with the portion of the web content, wherein the voice communication data is indicative of an offline transaction associated with the user and the web content; and determining outcome data associated with the offline transaction based on the database entry, wherein the data includes the plurality of interactions of the user and the portion of the web content.

16. The non-transitory computer readable medium of claim 15, the operations further comprising generating a graphical user-interface, wherein the graphical user-interface is auto-populated with the previously stored information which is identified from the user interactions and information corresponding to the offline transaction.

17. The non-transitory computer readable medium of claim 16, the operations further comprising, storing a transaction identifier indicating completion of the offline transaction, based on a notification received at the graphical user-interface.

18. The non-transitory computer readable medium of claim 15, the operations further comprising:

generating a pool of phone numbers for possible integration into the web content;

selecting the phone number from the pool of phone numbers; and verifying that the phone number should be integrated into the web content.

19. The non-transitory computer readable medium of claim 15, wherein obtaining voice communication data comprises receiving an indication indicating that the phone number was called.

20. The non-transitory computer readable medium of claim 15, wherein the voice communication data comprises metadata assigning the phone number to the web content and information identifying a mobile device used to establish the call.

* * * * *

UNITED STATES PATENT AND TRADEMARK OFFICE
CERTIFICATE OF CORRECTION

| | | |
|---|---|---|
| PATENT NO. | : 12,045,853 B2 | |
| APPLICATION NO. | : 16/641135 | |
| DATED | : July 23, 2024 | |
| INVENTOR(S) | : Brian Handrigan et al. | |

It is certified that error appears in the above-identified patent and that said Letters Patent is hereby corrected as shown below:

On the Title Page

Item (54), and in the Specification, Column 1, Line 2, Replace "AN" with ---AND---

Signed and Sealed this
Fifth Day of November, 2024

Katherine Kelly Vidal
*Director of the United States Patent and Trademark Office*